United States Patent
Priem et al.

(10) Patent No.: US 6,282,587 B1
(45) Date of Patent: *Aug. 28, 2001

(54) METHOD AND APPARATUS FOR ACCELERATING THE RENDERING OF IMAGES

(75) Inventors: Curtis Priem, Fremont; Rick Iwamoto, Cupertino; Stephen Johnson, San Jose, all of CA (US)

(73) Assignee: Nvidia Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/602,668

(22) Filed: Jun. 26, 2000

Related U.S. Application Data

(63) Continuation of application No. 09/061,719, filed on Apr. 17, 1998, now Pat. No. 6,092,124.

(51) Int. Cl.[7] ................................................. G06F 13/00
(52) U.S. Cl. ................................. 710/23; 710/33; 710/52
(58) Field of Search .......................... 710/23–35, 52–57, 710/130; 711/202; 709/212; 320/326; 370/316

(56) References Cited

U.S. PATENT DOCUMENTS

| | | | |
|---|---|---|---|
| 5,301,287 | 4/1994 | Herrell et al. | 711/202 |
| 5,333,290 | 7/1994 | Kato | 710/26 |
| 5,416,916 | 5/1995 | Bayle | 710/130 |
| 5,590,377 | 12/1996 | Smith | 710/22 |
| 5,678,062 | 10/1997 | Okada et al. | 710/22 |
| 5,696,990 | 12/1997 | Rosenthal et al. | 395/849 |
| 5,721,947 | 2/1998 | Priem et al. | 710/4 |
| 5,778,180 | 7/1998 | Gentry et al. | 709/212 |
| 5,781,799 | 7/1998 | Leger et al. | 710/22 |
| 5,828,903 | 10/1998 | Sethuram et al. | 710/53 |
| 5,835,788 | * 11/1998 | Blumer et al. | 710/23 |
| 5,862,135 | 1/1999 | Petty | 370/376 |
| 5,933,654 | 8/1999 | Galdun | 710/23 |
| 5,943,504 | 8/1999 | Flurry et al. | 710/22 |
| 5,978,866 | 11/1999 | Nain | 710/22 |
| 6,023,738 | 2/2000 | Priem et al. | 710/23 |
| 6,092,124 | * 7/2000 | Priem et al. | 710/23 |
| 6,105,075 | * 8/2000 | Ghaffari | 710/5 |

FOREIGN PATENT DOCUMENTS

98/12630 * 7/1997 (WO) .............................. G06F/13/00

* cited by examiner

Primary Examiner—Christopher B. Shin
(74) Attorney, Agent, or Firm—Girard & Equitz LLP

(57) ABSTRACT

A direct memory access (DMA) circuit which is physically positioned with an input/output device, the DMA circuit storing a first reference value pointing to a data structure which describes a buffer portion of system memory in which data is stored for transfer to the I/O device, a value determining a position within the buffer portion of system memory beginning at which a next sequence of data is to be placed, and a value determining a position within the buffer portion of system memory from which a next sequences of data is to be copied to the I/O device, the DMA circuit including circuitry for reading data from the buffer portion of system memory beginning at the position from which a next sequences of data is to be copied and for writing the data read to the I/O device.

11 Claims, 4 Drawing Sheets

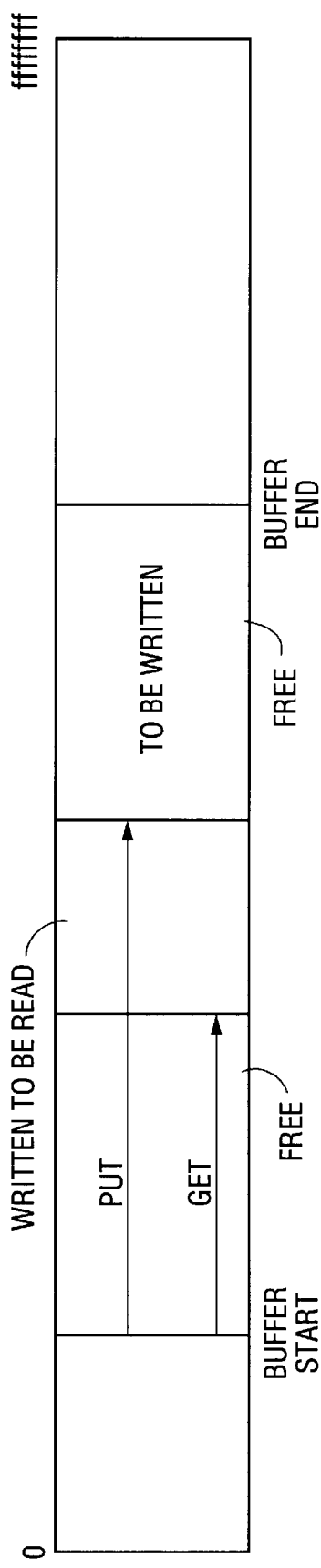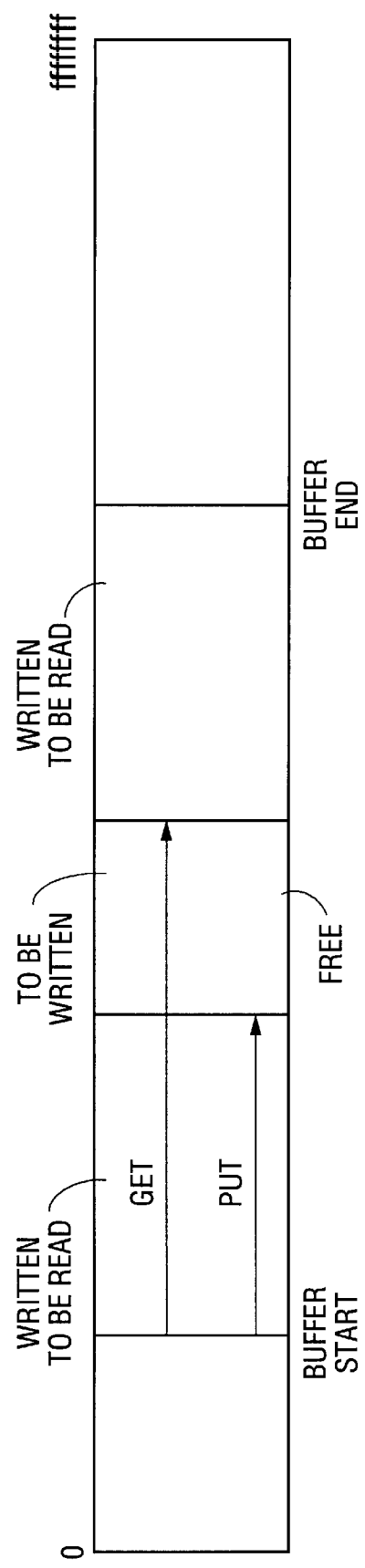

METHOD AND APPARATUS FOR ACCELERATING THE RENDERING OF IMAGES

This is a continuation of application Ser. No. 09/061,719, filed Apr. 17, 1998, now U.S. Pat. No. 6,092,124.

BACKGROUND OF THE INVENTION

1. Field of the Invention

This invention relates to computer systems, and more particularly, to methods and apparatus for accelerating the transfer of data to be utilized by a computer input/output (I/O) device.

2. History of the Prior Art

In computers running modern multitasking operating systems, it has to typically been necessary to call the operating system to write any data to memory-mapped input/output devices. This has been required to assure that operations conducted by the application programs are safe and do not write over the assets of the system or other application programs. Consequently, in order to display graphics data on a computer output display, the operating system has typically conducted the transfer. This is a very slow process because it is complicated and not conducted in hardware. With the emergence of multimedia programming, the process has become too slow.

Recently, a new I/O architecture has been devised which allows direct writes by an application program to an I/O control unit which resides with and controls data transfers to I/O devices in a multitasking operating system. The I/O control unit assures that only operations which are safe are sent to I/O devices thereby allowing an application program to bypass the security furnished by the operating system without endangering the operation of the system or the assets of other applications. The architecture utilizes hardware to accomplish its operations and thus makes writing to I/O devices very much faster than prior art architectures by eliminating the very long times required to write utilizing the operating system.

When writing to an I/O device using the new architecture, an application program executing on a computer central processor causes commands including an address and data to be sent to the I/O control unit for transfer to the I/O device joined to the control unit. Since an application can know only virtual addresses without operating system assistance, the I/O control unit must furnish the physical address for the I/O device and assure that the operation is safe. Once the physical address has been determined, it is held in a register on the I/O control unit so that all subsequent commands including the same virtual address are sent directly to the selected I/O device.

Data transfers from an application program to I/O devices in computer systems utilizing memory-mapped I/O are typically handled by the memory control unit once generated by the central processor. The application indicates to the processor where the desired data resides in memory, the extent of the data, and the address to which it is to be transferred. The bus control unit receives the data, acquires the system bus, and transfers the data over the system bus to the I/O control unit. This allows the central processor to attend to other operations while the data is being transferred. When a significant amount of data is involved, the bus control unit transfers small increments of the data at a time over the bus to the I/O control unit and repeats the process until all of the data has been transferred to the I/O control unit.

In order to assure that data will be available to an I/O device without delay, the new architecture includes a relatively large input buffer on the I/O control unit which controls the writes to the graphics accelerator or other I/O device. This first-in first-out (FIFO) buffer allows large amounts of data to accumulate from a myriad of small transfers from the bus control unit so that the accelerator does not have to wait for each new transfer before it can proceed. Such a solution accelerates the transfer of data from the processor to the graphics accelerator significantly by reducing the need for either the central processor or the graphics accelerator to wait for the other in order to continue with operations. The new architecture including such a FIFO input buffer is described in U.S. Pat. No. 5,696,990, entitled Method and Apparatus for Providing Improved Flow Control For Input/Output Operations a Computer System Having a FIFO Circuit And An Overflow Storage Area, issued Dec. 9, 1997, to Rosenthal et al.

A hardware buffer is expensive and must be finite in size; consequently, an input buffer of 128 bytes has been selected as a useful compromise for typical uses. However, where large amounts of data are being transferred as in graphics operations, it is necessary to monitor the condition of the FIFO input buffer in order to guard against overflow. If the FIFO input buffer overflows in a system such as described in which the central processor is decoupled from I/O devices, the data being transferred will be lost. For this reason it has been necessary to provide a means to indicate to the central processor when the FIFO is able to receive additional data. To accomplish this, the I/O control unit includes circuitry which keeps track of the FIFO buffer space available and furnishes this information in a local register on the I/O control unit. The central processor reads the register for the condition of the FIFO buffer before sending any new sequence of data to an I/O device. The need for the central processor to read the amount of space available in the FIFO buffer before sending any additional data slows the transfer of the graphics data to I/O devices significantly.

This arrangement has recently been improved to allow more rapid writing of data to I/O devices. The improved arrangement utilizes a first data structure to establish a very large variable-sized buffer in main memory to store data being transferred to I/O devices and a second data structure to establish a second buffer in main memory in which a notification may be placed to indicate the completion of a write operation.

The arrangement utilizes a direct memory access (DMA) engine having a series of registers which an application uses to indicate a portion of the buffer which contains data to be moved to the I/O device and the extent of the data to be moved. The DMA engine keeps a reference value to find the first data structure indicating the memory buffer from which the data stored is to be transferred. When the transfer is complete, the DMA engine uses another reference value referring to the second data structure to place a notification that the operation is complete in the notification memory area and signals the processor to review the status of the transfer.

The arrangement allows very large increments of data to be rapidly transferred to I/O devices safely without involving the central processor to any significant extent. However, in some modern interfaces, a very large number of smaller increments of data must be transferred in order to make up the total amount of data being transferred. In such situations, the amount of time required to accomplish the set up of the DMA engine for each transfer becomes a very significant portion of the transfer time. The set up time significantly slows the transfer operation.

It is desirable to increase the speed at which graphics data may be transferred from memory to a graphics accelerator while freeing the central processor for other activities.

SUMMARY OF THE INVENTION

It is, therefore, an object of the present invention to provide an improved method for more rapidly transferring data to input/output devices.

These and other objects of the present invention are realized by a direct memory access (DMA) circuit which is physically positioned with an input/output device, the DMA circuit storing a first reference value pointing to a data structure which describes a buffer portion of system memory in which data is stored for transfer to the I/O device, a value determining a position within the buffer portion of system memory beginning at which a next sequence of data is to be placed, and a value determining a position within the buffer portion of system memory from which a next sequences of data is to be copied to the I/O device, the DMA circuit including circuitry for reading data from the buffer portion of system memory beginning at the position from which a next sequences of data is to be copied and for writing the data read to the I/O device. These and other objects and features of the invention will be better understood by reference to the detailed description which follows taken together with the drawings in which like elements are referred to by like designations throughout the several views.

BRIEF DESCRIPTION OF THE DRAWINGS

FIG. 4 is a diagram illustrating another condition of a transfer buffer created in an embodiment of the invention.

DETAILED DESCRIPTION

Figure 1:
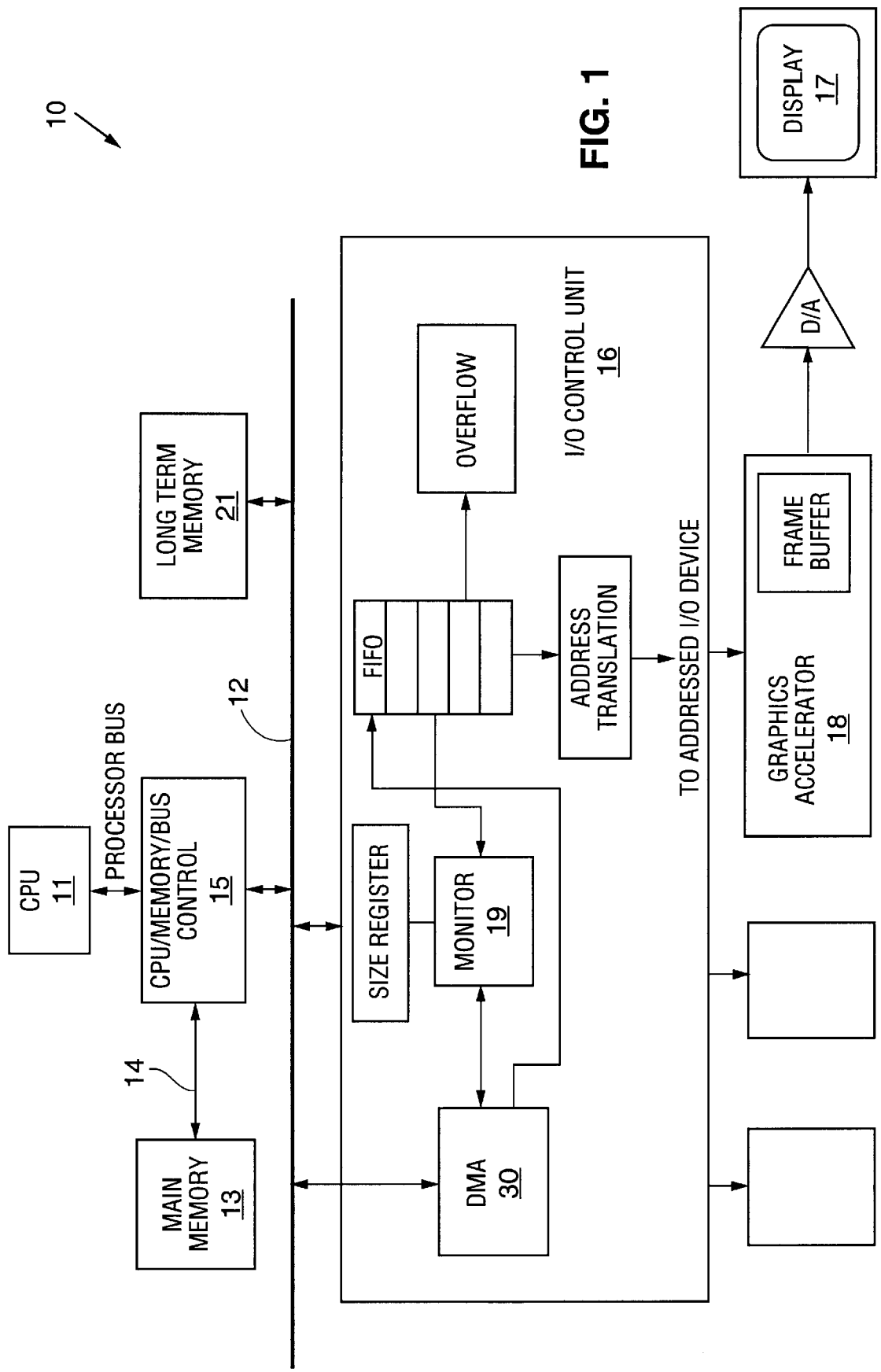
FIG. 1 is block diagram illustrating a circuit for practicing the present invention.

FIG. 1 is a block diagram illustrating a computer 10 which may utilize the present invention. The computer 10 includes a central processing unit 11, a system bus 12, main memory 13 joined to the central processing unit 11 by a high speed memory bus 14 via a bus control unit which controls access to the system bus 12, long term memory 21, an I/O control unit 16 associated with various I/O devices, and an output display 17. Typically, the I/O devices may include devices such as a graphics accelerator circuit 18 for manipulating the graphics data furnished to the accelerator to generate pixel data which is stored in a frame buffer and transferred by a digital-to-analog converter circuit to operate an output display 17. It should be noted that the present invention may be used be utilized in computer architectures which vary from that illustrated in FIG. 1 without departing from the spirit and scope of the invention. For example, tan I/O control unit and associated I/O devices might be utilized with a fast graphics bus such as the AGP bus designed by Intel Corporation of Santa Clara, California, or in integrated systems with buses internal to the central processing chip.

Historically, when an application transfers data to an I/O device such as the graphics accelerator 18, the central processing unit accesses the data in the system memory and transfers a small portion of the data to the bus control unit 15. The bus control unit 15 buffers the data and controls its transfer to the graphics accelerator. Typically, the bus control unit 15 stores a few bytes of data in its buffer, signals the bus 12 that it has data to transfer, acquires control of the bus 12, and sends the data to the graphics accelerator. This is a relatively slow process which is complicated by the fact that an application program selects data to be transferred using virtual addresses. In order to access the data in physical memory, these virtual addresses must be translated to physical addresses by calls to the operating system.

The new I/O architecture described in the above-referenced patent allows an application program executing on the central processor to write directly to I/O devices without requiring the operating system to conduct address translation and other security functions. The new architecture accomplishes this by positioning an I/O control unit with the I/O devices to do address translation and check the safety of the operation. Once a translation to a physical address has been accomplished, the physical address is used to allow direct writing to the particular I/O device for subsequent commands.

In order to help accelerate the transfer to I/O devices, the I/O controller utilizes an input FIFO which is able to store a large number of commands. Since virtual-to-physical address translation occurs at a point which is asynchronous to the central processor, the FIFO stores commands which include both an address and data destined for the address. One problem which slows this arrangement is a need to check before each large sequence of command data is sent to determine whether space exists in the input FIFO to hold the data because overflow means lost data. Checking the space available has required a read of a register on the I/O control unit by the central processor and slows large transfers appreciably.

In a recent improvement, a direct memory access (DMA) engine 30 is provided as a part of the I/O control unit 16 or other I/O device to which rapid writing is to be accomplished. The DMA engine includes a number of registers which store values used to facilitate the transfer of data. A first register stores a value furnished by a software driver. This value points to a data structure which defines a portion of main memory used as a buffer for data to be transferred by the DMA engine. The data structure is established by driver software for the I/O control unit in response to commands issued by an application program. The data structure includes an offset in memory at which the transfer buffer begins and the extent of the buffer, indicates the page table entries for the memory addresses within the transfer buffer in one embodiment, and may indicate other particulars relating to the buffer.

A second DMA register stores a value indicating an offset within the memory buffer at which a particular data transfer commanded by the application program is to start. A third register stores the length of the data to be transferred beginning at the offset address. A fourth register stores a reference value furnished by the software driver indicting a second data structure defining a second region of system memory at which a notify area is established.

In one embodiment of the arrangement, an application program establishes the first and second data structures using the software driver by furnishing a buffer start offset and length. The driver in one embodiment cooperates with the operating system memory management software to look up the page tables at which the data areas indicated by the application program are actually resident in memory and to transfer those portions of memory to main memory and lock them down. The driver records the page table entries for the transfer buffer in the first data structure and furnishes reference values to the first and fourth DMA registers pointing to the two data structures.

When an application program then wants to write data to an I/O device, it sends the virtual start address and the length of the transfer directly to the DMA engine in one embodiment. The DMA engine uses the reference value in the first register to find the first data structure and the transfer buffer in main memory. It uses the virtual start offset and the page tables to find the actual start address and the data to be transferred and starts the transfer of data. When the transfer is complete, the DMA engine uses the reference value in the fourth register to find the second data structure and the notification area in main memory to place the notification. The DMA engine signals the central processor (typically through an interrupt); and the central processor responds by reading the notification and determining that the transfer is complete. The DMA engine may then proceed to its next operation.

Since the DMA engine includes only four registers in its simplest embodiment, it must wait for the completion of any transfer before it can proceed to the next operation. However, by adding four additional registers for each additional buffer, additional main memory transfer buffers may be created. By creating such additional buffers, the transfer processes may be overlapped and more rapid transfers of data may be realized.

It has been discovered, however, that it is necessary to utilize at least eight individual transfer buffers in main memory in order to keep up with the graphics operations typical of a modern multimedia computer. This increases the amount of DMA hardware significantly. Moreover, a new bus has been designed for graphics operations by the Intel Corporation.

This bus furnishes data in relatively small increments so that the commands required to setup each new implementation of a transfer buffer become significant to the speed of operation at which transfers can occur. Since each setup operation requires at least a virtual start address and a length value and is terminated only after a notification has been read, the time for administering the DMA channels becomes a large part of the time required to accomplish the transfer when the amount of data being transferred is relatively small. Among these factors, the time required for the central processor to read the notification area of main memory after each transfer significantly slows the operation.

The present invention provides an alternate method of transferring data to I/O devices which allows both very large and very small amounts of data to be transferred to I/O devices such as graphics accelerators without significant use of the central processing unit and eliminates the need for the central processor to read the notification area after each operation. The present invention also eliminates the need for the large number of registers required in the earlier development and simplifies various state machines required for operating the DMA engine.

Figure 2:
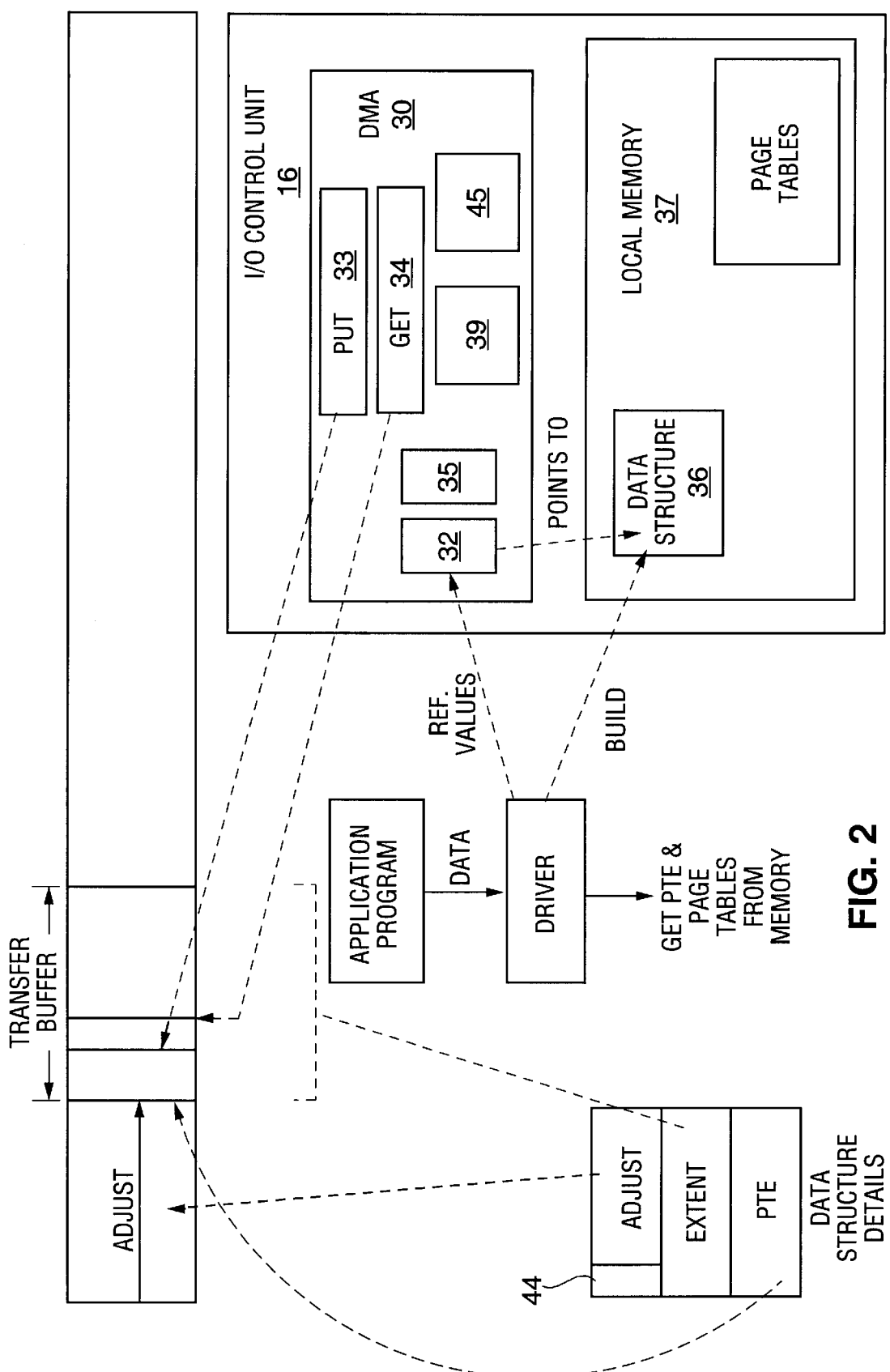
FIG. 2 is a diagram illustrating an arrangement for transferring data to I/O devices in accordance with an embodiment of the present invention. to FIG. 3 is a diagram illustrating one condition of a transfer buffer created in an embodiment of the invention.

As with the earlier invention, the DMA engine 30 is positioned as a part of the I/O control unit 16 or I/O device to which the data is to be transferred in the manner shown in FIG. 2. One embodiment of the DMA engine includes four individual registers which are utilized in carrying out the invention. A first register 32 again includes a reference value pointing to a first data structure which defines the transfer buffer established in main memory to hold the data to be transferred to the I/O device. This reference value is furnished by the software driver utilized by the application program to set up the data structure 36 defining the buffer. The data structure 36 may be placed in any portion of memory which is convenient to the operation. In the embodiment illustrated, the data structure defining the transfer buffer is conveniently stored in local memory 37 on the I/O control unit 16 adjacent the DMA engine 30. The data structure in this embodiment (shown in FIG. 2) includes a virtual memory address at which the buffer begins and a value indicating the extent (the length) of the buffer from the virtual memory offset. These values allow a transfer buffer of any convenient size to be established. For example, a transfer buffer of two megabytes may be a reasonable size for handling transfers of graphics data to a graphics accelerator device. On the other hand, the size of the transfer buffer is limited only by the amount of space available in main memory and depends entirely on the individual computer arrangement involved.

The data structure 36 of the described embodiment also includes one or more page table entries giving the physical address in memory at which each page defining the transfer buffer begins. Since an application program is aware of only virtual memory addresses in a system using virtual memory, the virtual memory addresses furnished by the application program are translated to physical addresses in main memory at which data actually resides so that the data may be accessed by the central processor and otherwise referred to during any transfers. In prior art architectures before that disclosed in the above-mentioned patent, the operating system accomplishes this address translation. However, by indicating the page table entries in the data structure and copying the page tables to available off-screen memory 37 on the I/O control unit 16 as is shown in the illustrated embodiment, the DMA engine itself is made capable of accomplishing any virtual-to-physical address translations necessary during the transfer without requiring an interrupt to the central processor for obtaining assistance from the operating system. This allows an application program to write the commands directly to the DMA engine without the delays attendant upon waiting for translation by the operating system. The DMA engine includes circuitry 39 such as a state machine which uses the page table information to translate virtual to physical addresses during transfer of the data from the buffer to the I/O device.

Of course, it is also possible to utilize the invention with the slower address translation process typical of the prior art in which the operating system takes care of address translations and security checks. However, such a process would be slower because it would necessitate the operating system being involved in all address translations and would eliminate the ability of an application to selectively pick different I/O devices without operating system intervention.

Thus, the creation of the data structure allows an area in main memory to be established at which one or more transfer buffers of a size limited only by main memory size may be positioned. When such a data structure has been completed by the application and kernel driver, the kernel driver causes the pages designated by the data structure (or some portion thereof) to be locked down in main memory so that they cannot be removed. At this point, the data structure defines an area of main memory (designated by the adjust, extent, and page table entries) which may be used as a transfer buffer by any I/O device associated with the DMA engine.

It should be noted that other information may also be a part of the data structure which defines a transfer buffer. For example, in one embodiment of the invention, the data structure indicates where in memory the transfer buffer is placed. Although it is especially useful for increasing the speed of writes to I/O devices that the transfer buffer be in main memory, in some situations it is desirable to be able to create a large buffer in memory other than main memory (for example, memory 37 which is associated with the DMA engine 30 on the I/O control unit) from which the DMA engine may rapidly transfer data to other portions of an I/O device. In one case, a single bit indication 44 may be kept in the data structure for indicating either main memory or another portion of memory (such as off-screen memory on a graphics accelerator) in which the buffer is established. Indications using a larger number of bits may be used for selecting among other memory subsystems or buses.

Although a first embodiment of the DMA engine 30 includes four registers, those registers hold different values than do the registers of the earlier arrangement. The values held in the second and third registers are used in the present invention to define a particular position in the memory buffer from which a transfer is to take place. A first value in register 34 which is updated by the DMA engine indicates an offset (generally referred to as "get") at which the DMA engine should begin to read data to be written to the I/O device. The DMA engine reads until it reaches a second offset (generally referred to as "put") which is placed in the third register 33 and updated by the central processing unit to indicate the offset at which the central processor should write the next sequence of data to the transfer buffer on command from the application program. The fourth register stores a value obtained from the data structure indicating the total length of the buffer area in memory. In a different embodiment, the fourth register is omitted, and the length value is simply computed and retained by state machine circuitry 39 associated with the DMA engine.

Once the DMA engine has begun reading data from the buffer at the first or "get" pointer, it may continue to read and transfer data to the I/O control unit (updating the "get" pointer as it progresses) until it reaches the end of sequences of data at the second "put" pointer. Since the data being transferred may be placed in the transfer buffer in main memory at addresses specified by the application program commanding the transfer to an I/O device before the transfer of data begins, the application may position all individual sequences of data in sequential positions in the transfer buffer. Any number of individual sequences of data may be placed adjacent one another in the buffer; and the DMA engine will read each in its turn without any need to stop and cause a notify indication to be sent to the central processor. Thus, the central processor, whenever data is to be sent to an I/O device, reads the "put" offset in the third register or a cached version in the central processing unit of the "put" offset and places the new data in the buffer beginning at the offset indicated by the "put" pointer. The central processor reads the "get" offset in the second register (or a cached version in the central processing unit). Before commencing the operation, the central processor uses the "get" and "put" values to determine whether space is available in the I/O FIFO buffer. The application then writes the new "put" offset directly to the third register of the DMA engine. On the other hand, as the DMA engine reads the data in the transfer buffer, it changes the "get" offset in the second register to the offset following the last offset read from the buffer. When data is in the transfer buffer, the DMA engine uses a state machine 45 to determine how much free space exist in the I/O input FIFO. If space is available, the transfer may begin; and the DMA engine simply begins reading data at the "get" offset and writes that data to the I/O device. As the DMA engine reads data, it increments the value of the "get" offset in the "get" register. The DMA engine continues to read the data and write it to the I/O device so long as data exists, and the "get" offset is r at equal to the "put" offset which indicates that the transfer buffer is empty. The central processor under control of an application may continue to move new data into the transfer buffer at the "put" offset during periods in which data is being read from the buffer and to write a new "put" offset directly to the "put" register. There is no need for the central processor to wait for a notify signal before transferring a next sequence of data or placing more data into the buffer. This greatly increases the speed of operation.

The buffer is especially effective with smaller increments of data such as those made available by the new graphics interface designed for its Pentium II processors by the Intel Corporation. An application need only write the "put" offset to the "put" register of the DMA engine once the transfer buffer data structure has been established to cause the processor to begin copying the sequences of data to the transfer buffer. The DMA engine essentially continues writing adjacent sequences of data until it ultimately writes the data last copied to the transfer buffer. When the DMA engine reaches the "put" pointer position, it ceases transferring data. Thus, only a new "put" offset is required as a command to initiate and carry out the operation of the new arrangement. With a large number of transfers of smaller sequences of data, no interruption of the processor to set up the DMA engine or to wait for the notify is required.

As may be seen in FIG. 3, the amount of space available in the transfer buffer of the present invention is usually the difference between the "put" offset and the end of the buffer. This value is computed by the DMA engine using the "put" value and the length of the transfer buffer provided by the application program to the data structure. The state machine continues to compare the space available by comparing the "put" value and the end of buffer value. Once the "put" offset has reached the end of the buffer, the state machine activates a routine which automatically changes the "put" offset to the head of the buffer. At this point, the space available in the buffer becomes the difference between the "put" and "get" values.

One problem which occurs with the described embodiment of the invention occurs when the "put" pointer nears the end of the transfer buffer. Since the buffer is circular, the DMA enigine will utilize all values within the area designated for the buffer. Since the number of bytes of command data available for transfer to the buffer may not exactly fit the space available, the programmer must write software to take care of this condition. Thus, if sixteen bytes are to be written to the buffer but only twelve bytes of space is available, software must be written to place the first twelve bytes in the area available and the remainder at the beginning of the buffer. Alternatively, software may be written to fill the remaining byte positions in the buffer with "no-op" commands and the I/O devices be made aware of such commands so that there is no attempt to execute invalid data by an I/O device. As will be seen later, the present invention provides for this method of handling the problem.

A second embodiment of the invention obviates the problem created as the "put" pointer nears the end of the buffer. Instead of writing code to take care of the particular situation involved, a jump instruction is written into the transfer buffer which is recognized by the state machine 39 of the DMA engine as it transfers data from memory to the I/O device. The jump instruction essentially commands the DMA engine to reset the value of the "get" offset to the initial offset of the transfer buffer. Whenever the amount of space available in the buffer becomes suspect, a programmer simply inserts a jump instruction as a last command in the transfer buffer following the sequences of command data and then sets the "put" pointer to the beginning (or some other position) of the transfer buffer. When the data in the transfer buffer has all been sent to the I/O control unit and the jump instruction is received by the state machine 39, the jump instruction calls a function which resets the "get" pointer to the beginning of the buffer and causes the state machine to compute space remaining as the space between the "put" and end of buffer. This eliminates all need for the complicated software described above to handle boundary conditions at the end of the buffer.

An additional advantage of the use of the jump instruction is that it allows the position of the "get" pointer to be moved to the beginning of any one of a plurality of different transfer buffers each established by an individual data structure or established within a single large data structure. Thus, the size of the overall transfer buffer may be changed on the fly by simply adding more transfer buffers and moving the "get" pointer from buffer to buffer.

A number of other commands can be implemented which make the present invention especially useful. In one embodiment of the invention, the state machine 39 is designed to detect a number of commands and function in a number of states depending on the particular command being carried out. FIGS. 5A–5D illustrate formats for different commands which have been implemented. The ability to carry out a number of different commands allows the DMA engine to function at a very advanced level in carrying out its operations. Other commands which provide additional functions will be obvious to those skilled in the art after reviewing the manner in which the described commands are used to render the DMA operations more effective.

In general, the commands involve a number of methods for moving data. These commands are implemented in some circumstances by a "method count" (a move data command) which describes the operation, an amount of data, and an offset in the transfer buffer at which data resides which is to be transferred to an I/O device. In its simplest form (shown in FIG. 5A), the command is indicated by "000" in the high order bits 29–31, the command includes a count which indicates the number of bytes of method data which are to follow, indicates a DMA subchannel to be used for the transfer and an offset into the DMA engine. This is followed by a series of sequences of data each of which is offset sequentially in increments of one from the "get" offset in the transfer buffer. In implementing this command, the state machine causes the DMA engine to increment the offset at which data is read from the transfer buffer and increments the offset to which the data is written in the I/O control unit. This allows a long sequence of data to be transferred with a single command to a number of individual registers on the I/O control unit.

Figure 5A:
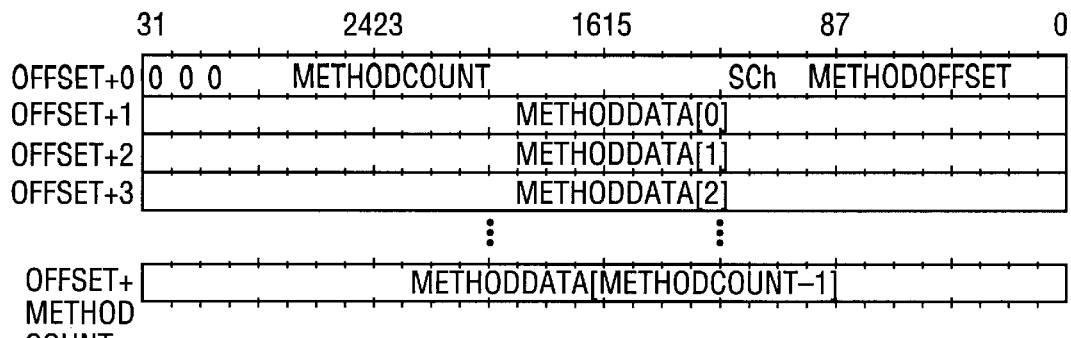
FIGS. 5A–5D illustrate formats of various commands which may be executed by a direct memory access controller designed in accordance with the present invention.
Figure 5B:
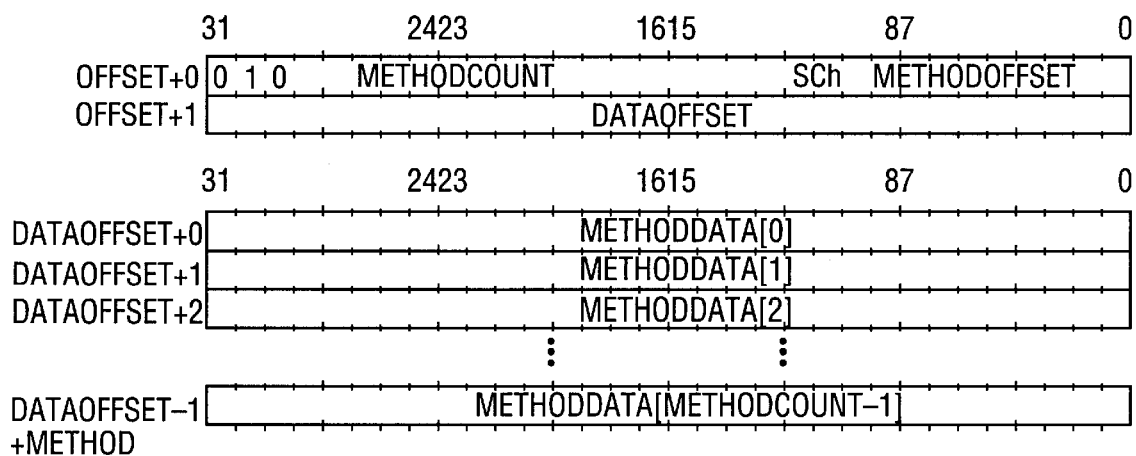

FIG. 5B illustrates a second transfer command of a slightly different form which is indicated by the three highest order bits "010." This command also includes a count of the number of bytes to be transferred, the channel to be used, and the offset to write the data in the DMA engine. However, the command is followed by a value at the next sequential offset which indicates an offset for data. The data offset may be anywhere within the transfer buffer. This allows a much greater flexibility in arranging data for transfer to the I/O control unit. This allows the user to separate his data from the commands in the transfer buffers allowing the DMA engine to read the user's data structures directly or the data structures of an API. These non-incrementing transfer are especially useful with DMA transfers since the do not require that the data be rearranged to fit the command sequences. As shown in the figure, this command is followed by a sequence of transfers from a series of incrementing data offset positions.

Both of the transfer commands shown in FIGS. 5A and 5B may be varied by a command format which may differ only in the three upper bits of the command but which indicate that the command is a non-incrementing command. In a non-incrementing transfer command, the address to which the data is to be written remains the same throughout the transfer. When the command of FIG. 5A is modified to be non-incrementing, the command is followed by the data to be transferred which resides at incrementally sequential offsets in the transfer buffer. When the command of FIG. 5B is modified to be non-incrementing, the data is positioned at some other part of system memory than immediately following the command in the transfer buffer.

Figure 5C:
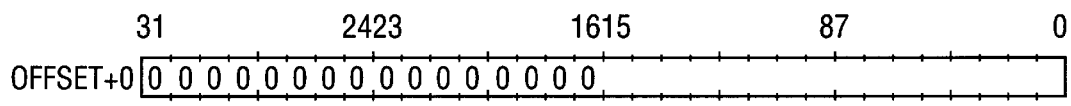

FIG. 5C illustrates a NOP command which may be used in the manner discussed above to accomplish various purposes such as filling the end of the transfer buffer in order to eliminate the need to include commands programmed for each transfer of data as the get offset approaches the end of the transfer buffer. The NOP command utilized has all zeroes in all positions above the fifteen bit so that, effectively, the count of data to be moved is zero. Since the zeroes indicate no operation is to take place, the lower fifteen bits indicating an offset in the DMA engine are simply ignored.

Figure 5D:
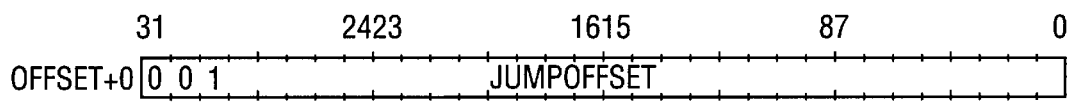

FIG. 5D illustrates a jump instruction utilized in implementing the invention. The instruction includes the jump command in its upper sixteen bits and an offset to jump to in the lower sixteen bits. The instruction is implemented by placing the offset into the "get" register of the DMA engine so that the DMA operation simply jumps to that offset for its next operation. This particular embodiment allows a jump range which includes a total of 512 megabytes of memory and greatly facilitates the use of multiple transfer buffers in memory.

A modification of a jump instruction named a "call and return" command may be selected by varying the upper three bits of the command. This command causes the DMA engine to jump to an offset indicated in the lower twenty-nine bits of this instruction. The current address of the command is stored; when the transfer at the offset has completed, the return command indicates the state machine should return to the saved pre-call offset incremented by one (or other value).

As may be seen, these commands make the DMA engine able to handle very advanced operations. Other commands such as conditional jumps may be implemented to increase the facility of the DMA engine and the invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A direct memory access (DMA) circuit for use with an input/output device and a memory having a buffer portion in which data is stored for transfer to the input/output device, wherein the DMA circuit holds a first value determining a put position within the buffer portion beginning at which a next sequence of data is to be placed, and a second value determining a get position within the buffer portion beginning at which a next sequence of data is to be copied to the input/output device, and wherein the DMA circuit includes:

data transfer circuitry configured to read data from the buffer portion of the memory beginning at the get position and to copy the data read to the input/output device until the first value equals the second value; and a state machine configured to respond to a jump instruction read by the data transfer circuitry from the buffer portion by causing the DMA circuit to substitute a third value determined by the jump instruction for the second value, wherein the third value determines another get position within the buffer portion beginning at which the next sequence of data is to be copied to the input/output device.

2. The circuit of claim 1, wherein the jump instruction comprises a set of bits, and the third value is a subset of said set of bits.

3. A direct memory access (DMA) circuit for use with an input/output device and a memory having a buffer portion in which data is stored for transfer to the input/output device, wherein the DMA circuit holds a first value determining a put position within the buffer portion beginning at which a next sequence of data is to be placed, and a second value determining a get position within the buffer portion beginning at which a next sequence of data is to be copied to the input/output device, and wherein the DMA circuit includes:

data transfer circuitry configured to read data from the buffer portion of the memory beginning at the get position and to copy the data read to the input/output device until the first value equals the second value; and a state machine configured to respond to a call instruction and a return instruction read by the data transfer circuitry from the buffer portion by causing the DMA circuit:

in response to the call instruction, to store a third value and substitute a fourth value determined by the call instruction for the second value, wherein the fourth value determines a second get position within the buffer portion beginning at which a sequence of data is to be copied to the input/output device, and the third value determines a third get position within the buffer portion beginning at which another sequence of data is to be copied to the input/output device; and in response to the return instruction, to substitute the third value for the fourth value after the data transfer circuitry reads the sequence of data from the buffer portion beginning at the second get position and copies said sequence of data to the input/output device.

4. A direct memory access (DMA) circuit for use with an input/output device and a memory having a buffer portion in which data is stored for transfer to the input/output device, wherein the DMA circuit holds a first value determining a put position within the buffer portion beginning at which a next sequence of data is to be placed, and a second value determining a get position within the buffer portion beginning at which a next sequence of data is to be copied to the input/output device, and wherein the DMA circuit includes:

data transfer circuitry configured to read data from the buffer portion of the memory beginning at the get position and to copy the data read to the input/output device until the first value equals the second value; and a state machine configured to respond to a move data instruction read by the data transfer circuitry from the buffer portion by causing the DMA circuit to substitute a sequence of different values determined by the move data instruction for the second value, wherein the sequence of different values determines a sequence of positions within the buffer portion from which sequences of the data are to be copied to the input/output device.

5. The circuit of claim 4, wherein the state machine is configured to respond to the move data instruction also by causing the DMA circuit to copy the sequences of the data from the sequence of positions within the buffer portion to locations in the input/output device, wherein the locations are determined by a sequence of addresses determined by the move data instruction and the sequence of addresses includes a first address and additional addresses offset from the first address by incrementally increasing multiples of an offset value.

6. The circuit of claim 4, wherein the state machine is configured to respond to the move data instruction also by causing the DMA circuit to copy the sequences of the data from the sequence of positions within the buffer portion to a location in the input/output device determined by a single address, wherein the single address is determined by the move data instruction.

7. A method for operating a direct memory access (DMA) circuit to copy data from a memory to an input/output device, wherein the memory has a buffer portion in which data is stored for transfer to the input/output device, and the DMA circuit holds a first value determining a get position within the buffer portion beginning at which a sequence of the data is to be copied to the input/output device, said method including the steps of:

reading a jump instruction from the buffer portion;

in response to the jump instruction, substituting a second value determined by the jump instruction for the first value, wherein the second value determines a different get position within the buffer portion beginning at which a next sequence of the data is to be copied to the input/output device; and in response to the second value, copying the next sequence of the data to the input/output device from the buffer portion beginning at said different get position.

8. A method for operating a direct memory access (DMA) circuit to copy data from a memory to an input/output device, wherein the memory has a buffer portion in which data is stored for transfer to the input/output device, and the DMA circuit holds a first value determining a get position within the buffer portion beginning at which a sequence of the data is to be copied to the input/output device, said method including the steps of:

(a) reading a call instruction from the buffer portion;

(b) in response to the call instruction, storing a second value and substituting a third value determined by the call instruction for the first value, wherein the third value determines a second get position within the buffer portion beginning at which a next sequence of the data is to be copied to the input/output device and the second value determines a third get position within the buffer portion beginning at which another sequence of data is to be copied to the input/output device, and reading the next sequence of the data from the buffer portion beginning at the second get position and copying said next sequence of the data to the input/output device; and (c) reading a return instruction from the buffer portion, and in response to the return instruction, substituting the second value for the third value upon completion of step (b).

9. A method for operating a direct memory access (DMA) circuit to copy data from a memory to an input/output device, wherein the memory has a buffer portion in which data is stored for transfer to the input/output device, and the DMA circuit holds a first value determining a get position within the buffer portion beginning at which a sequence of the data is to be copied to the input/output device, said method including the steps of:

reading a move data instruction from the buffer portion;

in response to the move data instruction, substituting a sequence of different values determined by the move data instruction for the first value, wherein the different values determine different positions within the buffer portion beginning at which sequences of the data are to be copied to the input/output device.

10. The method of claim 9, also including the step of:

in response to the move data instruction, copying the sequences of data from the different positions within the buffer portion to locations in the input/output device, wherein the locations are determined by a sequence of addresses determined by the move data instruction and the sequence of addresses includes a first address and additional addresses offset from the first address by incrementally increasing multiples of an offset value.

11. The method of claim 9, also including the step of:

in response to the move data instruction, copying the sequences of data from the different positions within the buffer portion to a location in the input/output device determined by a single address, wherein the single address is determined by the move data instruction.

* * * * *